Patented Dec. 15, 1942

2,305,224

UNITED STATES PATENT OFFICE 2,305,224

METALLIC RECEPTACLE

Donald G. Patterson, Stamford, Conn., assignor to American Cyanamid Company, New York, N. Y., a corporation of Maine No Drawing. Application December 15, 1939, Serial No. 309,351

5 Claims. (Cl. 117—132)

This invention relates to metallic containers such as food and beverage cans which have a coating or liner containing a resinous material. The invention also relates to processes of producing articles coated with improved resinous coatings.

One object of this invention is to provide a resinous material for coating metallic receptacles such as beverage and food cans which resinous material contains no solvent which must be removed by vaporization. Another object of this invention is to provide a resinous coating on metallic receptacles which does not require a primer coat.

Still another object of this invention is to provide a resinous material for coating metallic receptacles which material is not only light-colored, hard and flexible but is also substantially odorless and tasteless. A further object of this invention is to provide resinous materials for can coating which may be cured quickly and which have good chemical resistance.

These and other objects are attained by coating sheet metal which is to be fabricated into metallic receptacles or by coating the preformed metallic receptacles with a resinous material of the type described below, and subjecting the coating to polymerization conditions.

The resinous materials suitable for use according to my invention are those prepared by means of the chemical reaction or polymerization of one or more resinous substances which possess a plurality of polymerizably reactive alpha, beta-enal groups

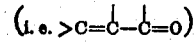

with at least one organic substance which contains the polymerizably reactive group $CH_2=C<$ and which preferably has a high boiling point and/or contains the allyl group $$CH_2=CH-CH_2-$$

The high boiling allyl compounds are the preferred reactive organic substances.

The following examples are given by way of illustration and not in limitation.

EXAMPLE 1

| | Parts by weight |
|---|---|
| Resin "A" | 60 |
| Diallyl phthalate | 40 |
| Benzoyl peroxide | 0.2 |
| Cobalt (linoleate) | 0.05 |

This solution is sprayed onto metallic receptacles such as beverage cans or the sheet metal to be used in fabricating such containers, and the coated article or metal is then baked at about 125° C. for ten to fifteen minutes. A strongly adherent, hard, flexible, water-white, odorless and tasteless coating is obtained which has good chemical resistance.

EXAMPLE 2

| | Parts by weight |
|---|---|
| Resin "A" | 60 |
| Diallyl maleate | 40 |
| Benzoyl peroxide | 0.2 |
| Cobalt (naphthenate) | 0.05 |

This solution may be applied to sheet metal or articles fabricated therefrom in the same way as in the preceding example, the baking being conducted at about 90° C. A hard, flexible and adherent film is obtained which has good chemical resistance and is odorless and tasteless.

EXAMPLE 3

| | Parts by weight |
|---|---|
| Resin "B" | 50 |
| Diallyl phthalate | 50 |
| Benzoyl peroxide | 0.2 |
| Cobalt (naphthenate) | 0.05 |

This composition is applied to tin which is to be used in fabricating receptacles or to preformed metallic receptacles by spraying. The coated article or metal is then baked at about 125° C. for about fifteen minutes. A hard, flexible, odorless and tasteless coating is obtained.

EXAMPLE 4

| | Parts by weight |
|---|---|
| Resin "A" | 25 |
| Resin "B" | 25 |
| Diallyl phthalate | 50 |
| Benzoyl peroxide | 0.2 |
| Cobalt (linoleate) | 0.05 |

This solution is applied to sheet metal or containers fabricated therefrom and the coated article or metal is baked at about 135° C. for several minutes. A hard, flexible, odorless and tasteless coating having good chemical resistance is obtained.

PREPARATIONS OF RESINS

EXAMPLE 5

*Preparation of resin "A"*

| | Parts by weight |
|---|---|
| Ethylene glycol | 1382 |
| Maleic anhydride | 1960 |
| Linseed oil fatty acids | 186 |

The glycol and maleic anhydride are reacted at about 180° C., preferably with stirring and under an inert atmosphere of carbon dioxide, until the reaction mixture becomes clear. The linseed oil fatty acids are then added and the heating and agitation continued until an acid number of about 25 is reached.

EXAMPLE 6

*Preparation of resin "B"*

|  | Parts by weight |
|---|---|
| Ethylene glycol | 100 |
| Maleic anhydride | 98 |
| Sebacic acid | 101 |
| Linseed oil fatty acids | 15 |

The glycol, maleic anhydride and sebacic acid are reacted preferably with agitation under an inert atmosphere of carbon dioxide at a temperature of about 180° C. After the reaction mixture becomes clear the linseed oil fatty acids are added and the reaction continued until the acid number is sufficiently low, e. g. preferably below about 25. The time required for this reaction is about twenty to thirty-six hours.

Other resins may be prepared using equivalent proportions of other glycols and other acids. If trimethylene glycol be substituted for the ethylene glycol in the above examples and the resulting resin substituted for resin "A" or resin "B", quite similar coatings will be obtained. If diethylene glycol be used in place of the ethylene glycol and the resulting resins substituted for resins "A" and "B", somewhat softer films will be obtained. Similarly softer films are obtained from coatings containing resins derived from triethylene glycol and alpha-propylene glycol.

Among the polymerizably reactive substances containing the group $CH_2=C<$ which I have found suitable for reaction with the reactive resins which contain a plurality of polymerizable alpha, beta-enal groups, the following are included: methyl methacrylate, vinyl acetate, styrene, acrylonitrile, methacrylonitrile, and the allyl compounds, more particularly the diallyl esters, e. g. diallyl maleate, diallyl fumarate, diallyl phthalate, diallyl succinate and diallyl sebacate. Other reactive substances containing the $CH_2=C<$ group such as vinyl compounds particularly the esters, and methacrylic acid esters could also be used. Furthermore, other allyl compounds may be used such as the monoallyl compounds e. g. monoesters of: allyl alcohol, 2-chlorallyl alcohol and methallyl alcohol although these react somewhat slowly. The diallyl esters are both quite reactive and high boiling which renders them especially useful from the commercial point of view. Triallyl esters may also be used, e. g. triallyl tricarballylate. Furthermore, allyl esters of inorganic acids may be used e. g. triallyl phosphate.

Among the reactive resins which may be used and which contain a plurality of polymerizably reactive alpha, beta-enal groups are those obtainable by the esterification of a polyhydric alcohol with an alpha, beta-unsaturated organic acid.

Among the alpha, beta-unsaturated organic acids which are preferred are the following: maleic, fumaric, itaconic and citraconic, although other similar acids may be substituted such as mesaconic, aconitic and halogenated maleic acids such as chloromaleic acid and furthermore any of the foregoing could be substituted in part with acrylic, beta benzoyl acrylic, methacrylic, $\Delta^1$-cyclohexene carboxylic, cinnamic and crotonic acids. Obviously various mixtures of these acids may be used where expedient. The term "acid" is used herein to designate the acid anhydride, as well as the acid itself since either may be used according to availability and desirability.

The resins may be modified with other substances which are used in alkyd resins i. e. monohydric alcohols, monobasic acids or dibasic acids e. g. phthalic acid, sebacic acid, etc. which do not contain groups polymerizably reactive with respect to organic substances containing $CH_2=C<$ groups. These modifying agents are usually used as diluents or plasticizers, chemically combined in the resin. The reactive resins may be prepared from various polyhydric alcohols although the glycols or mixtures of glycols with other alcohols are preferred. Among the alcohols which may also be used are glycerol, pentaerythritol, etc. When polyhydric alcohols containing more than two hydroxyl groups are reacted with the alpha, beta-unsaturated organic acids, the reaction mixture thereof tends to gel prematurely. Consequently, it may be preferable to use some monohydric alcohol in conjunction with the alcohols which contain more than two hydroxyl groups or else some monobasic acid may be used.

Among the glycols which may be used for the production of reactive resins by esterification with an alpha, beta-unsaturated organic acid the following are included: ethylene glycol, alpha-propylene glycol, polyethylene glycols, e. g. diethylene glycol, triethylene glycol, tetraethylene glycol, pentaethylene glycol, hexaethylene glycol, etc., polymethylene glycols e. g. decamethylene glycol, octadecandiol, 2,2-dimethyl propanediol-1,3, 1,3 butanediol, 1,2 propanediol, 2-ethyl 2-butyl butanediol-1,3.

The reactive resins may contain as modifiers substances such as the drying oils or other unsaturated acidic materials or esters thereof, e. g. undecylenic acid.

It is also possible to introduce initially into the resin structure a certain number of groupings of the type $CH_2=C<$ through the use of unsaturated alkyl compounds. One way of accomplishing this, for example, is by direct esterification of an unsaturated alcohol containing a $CH_2=C<$ group. Examples of such alcohols are allyl alcohol and methallyl alcohol.

The reactive resins may be modified in the same general manner as other alkyd resins. If a monohydric alcohol or a dibasic acid which does not contain polymerizably active groups with respect to organic substances containing $CH_2=C<$ groups be used, the proportion of such substances will depend on the properties required of the polymerized reactive solvent-reactive resin mixture. By the use of a relatively large proportion of a polymerizably active dibasic acid, e. g. maleic, in the reactive resin, a hard, tough polymer is produced upon subsequent reaction of said reactive resin with a reactive solvent. On the other hand, if the reactive resin is obtained from a relatively small proportion of polymerizably active dibasic acid and a relatively large proportion of acids which do not contain groups polymerizably active with respect to organic substances containing $CH_2=C<$ groups, a softer and more rubbery resin results upon polymerization with a reactive solvent. The same effect is produced by the introduction of other inactive ingredients. By varying the ingredients and the proportions of the ingredients, resins may be obtained having properties desirable for almost any particular use.

If it be desirable to introduce lower alkyl groups into the resin, this may be done by using maleic esters of monohydric alcohols, e. g. ethyl maleate. The alkyl ester will then be united with the resin by polymerization.

This invention relates to the use of combinations of reactive resin and reactive material containing the groups $CH_2=C<$ which are compatible. Compatibility may be established by the use of inert blending solvents where necessary although the use of only reactive materials is preferred.

The terms compatible and homogeneous as used in the specification and claims are intended to indicate a system the constituents of which are uniformly distributed throughout the whole mass and when applied to solutions, to indicate that these may be either true solutions or colloidal solutions as long as they are substantially stable.

Obviously if desirable, fillers, dyes and pigments may be added, as well as diluents. Among the diluents may be mentioned other natural or synthetic resinous materials e. g. shellac, cellulose esters and ethers, urea resins, melamine resins, phenolic resins, alkyd resins, ester gum, rubber, synthetic rubber-like products, etc.

Polymerization catalysts for the reactive materials include the organic peroxides. Still other polymerization catalysts may be used in some instances such as soluble cobalt salts (particularly the linoleate and naphthenate), p-toluene sulfonic acid, aluminum chloride, stannic chloride and boron trifluoride. In many instances it may be desirable to use a combination of these catalysts, e. g. the combination of benzoyl peroxide and a cobalt salt. Among the preferred catalysts there are: the acidic peroxides, e. g. benzoyl peroxide, phthalic peroxide, succinic peroxide and benzoyl acetic peroxide; fatty oil acid peroxides, e. g. lauroyl or cocoanut oil acid peroxides and oleic peroxide; alcohol peroxides, e. g. tertiary butyl peroxide and terpene oxides, e. g. ascaridole.

The concentration of catalyst employed is usually small, i. e. for the preferred catalysts, from about 1 part catalyst per thousand parts of the reactive mixture to about 2 parts per hundred parts of the reactive mixture. If an inhibitor be present, up to 5% or even more of catalyst may be necessary according to the concentration of inhibitor. Where fillers are used which contain high concentrations of substances which act as inhibitors, e. g. wood flour, the concentration of catalyst necessary to effect polymerization may be well above 5%.

The polymerization conditions referred to are heat, light or a combination of both. Ultra-violet light is more effective than ordinary light. The temperature of conversion depends somewhat on the boiling point of the reactive solvent and also on the pressures used. At atmospheric pressure, as in coating and casting operations, temperatures near or above the boiling point are unsuitable in most instances since substantial amounts of the solvent would be lost by evaporation before the reaction between the resin and solvent can be completed. Accordingly a temperature between room temperature (about 20°–25° C.) and the boiling point is usually employed where polymerization of this nature is carried out. The rate of polymerization doubles for about each ten degrees (C.) rise in temperature for this reaction. A temperature is selected which will give a suitable reaction rate and yet not cause substantial volatilization. The following table shows the approximate polymerization temperatures most suitable for the named solvents:

| Solvent | Temperature range | Preferred temperature |
| --- | --- | --- |
| Diallyl maleate | Room temperature to about 125° C. | 75° to 90° C. |
| Diallyl phthalate | Room temperature to about 150° C. | 75° to 125° C. |

The viscosity of the reactive mixture may be adjusted if desirable by heating in the presence of an esterification catalyst, e. g. p-toluene sulfonic acid, or the viscosity may be increased by "bodying," that is by heating the reactive mixture preferably in the absence of a catalytic material.

Polymerization inhibitors may be incorporated in the reaction compositions either in order to control the speed of polymerization or to increase the stability of the reactive compositions during storage. Among the inhibitors which may be used are phenolic compounds, especially the polyhydric phenols and the aromatic amines. Examples of these are hydroquinone, resorcinol, tannin, sym. alpha, beta-naphthyl p-phenylene diamine and phenolic resins. Sulfur compounds, benzaldehyde and 1-ascorbic acid may also be used.

The reactive resinous mixtures described herein may be applied to sheet metal or sheet metal receptacles by spraying, by brushing, by means of rollers, or by any other convenient method. The coated material or receptacles are then subjected to the polymerization conditions described above, e. g. heat.

Obviously many modifications in the compositions and processes described herein may be made without departing from the spirit and scope of the invention as defined in the appended claims.

I claim:

1. A metallic receptacle having a substantially odorless, tasteless and chemically resistant coating which is a material obtained by reacting an alpha, beta unsaturated dicarboxylic acid with a glycol in such proportions that there are present in the reacting mixture about one carboxyl group in said acid to one hydroxyl group in said glycol, to an advanced stage of esterification short of becoming completely insoluble and infusible, incorporating the product of such an esterification with a monomeric diallyl ester and thereafter subjecting the resulting solution to conjoint polymerization.

2. A metallic receptacle having a substantially odorless, tasteless and chemically resistant coating which is a material obtained by reacting a maleic acid with a glycol in such proportions that there are present in the reacting mixture about one carboxyl group in said acid to one hydroxyl group in said glycol, to an advanced stage of esterification short of becoming completely insoluble and infusible, incorporating the product of such an esterification with a monomeric diallyl ester and thereafter subjecting the resulting solution to conjoint polymerization.

3. A metallic receptacle having a substantially odorless, tasteless and chemically resistant coating which is a material obtained by reacting a maleic acid with a glycol in such proportions that there are present in the reacting mixture about one carboxyl group in said acid to one hydroxyl group in said glycol, to an advanced stage of esterification short of becoming completely insoluble and infusible, incorporating the product of such an esterification with a monomeric diallyl phthalate and thereafter subjecting the resulting solution to conjoint polymerization.

4. A metallic receptacle having a substantially odorless, tasteless and chemically resistant coating which is a material obtained by reacting a maleic acid with a glycol in such proportions that there are present in the reacting mixture about one carboxyl group in said acid to one hydroxyl group in said glycol, to an advanced stage of esterification short of becoming completely insoluble and infusible, incorporating the product of such an esterification with a monomeric diallyl maleate and thereafter subjecting the resulting solution to conjoint polymerization.

5. A process which comprises applying to a metallic receptacle a homogeneous mixture including a monomeric diallyl ester and a product obtained by reacting an alpha, beta unsaturated dicarboxylic acid with a glycol in such proportions that there are present in the reacting mixture about one carboxyl group in said acid to one hydroxyl group in said glycol to an advanced stage of esterification but short of becoming completely insoluble and infusible, and thereafter subjecting the applied mixture to conjoint polymerization.

DONALD G. PATTERSON.